(12) United States Patent
Campbell

(10) Patent No.: US 6,771,977 B1
(45) Date of Patent: Aug. 3, 2004

(54) DUAL MODE SATELLITE TERMINAL FOR EMERGENCY OPERATION

(75) Inventor: Thomas B. Campbell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/364,384

(22) Filed: Jul. 30, 1999

(51) Int. Cl.$^7$ .............................................. H04B 7/00
(52) U.S. Cl. ................... 455/522; 455/404.1; 455/431
(58) Field of Search ............................. 455/522, 521, 455/404–431, 435.2, 428, 13.4, 12.1, 127, 103, 11.1, 16, 17, 23, 24, 404.2, 114–116, 404.1, 427, 63.1, 422.1; 375/259, 224, 325, 219; 370/335, 277, 280, 281, 328, 329, 470, 476, 468, 477; 244/53 R, 60; 342/352, 356; 701/3; 379/37, 40, 39, 45, 204.01, 216.01; 340/540, 501, 686.1, 307

(56) References Cited

U.S. PATENT DOCUMENTS

| | | | | |
|---|---|---|---|---|
| 4,613,990 A | * | 9/1986 | Halpern | 455/33 |
| 5,166,972 A | * | 11/1992 | Smith | 379/49 |
| 5,471,648 A | * | 11/1995 | Gourgue | 455/63 |
| 5,483,670 A | * | 1/1996 | Childress et al. | 455/34.1 |
| 5,589,834 A | * | 12/1996 | Weinberg | 342/354 |
| 5,659,881 A | * | 8/1997 | Kent | 455/520 |
| 5,844,522 A | * | 12/1998 | Sheffer et al. | 342/457 |
| 5,926,133 A | * | 7/1999 | Green, Jr. | 342/363 |
| 5,930,295 A | * | 7/1999 | Isley, Jr. et al. | 375/219 |
| 5,930,684 A | * | 7/1999 | Keskitalo et al. | 455/69 |
| 5,956,644 A | * | 9/1999 | Miller et al. | 455/453 |
| 5,963,130 A | * | 10/1999 | Schlager et al. | 340/540 |
| 6,073,013 A | * | 6/2000 | Agre et al. | 455/428 |
| 6,091,934 A | * | 7/2000 | Berman et al. | 455/13.4 |
| 6,092,008 A | * | 7/2000 | Bateman | 701/14 |
| 6,104,914 A | * | 8/2000 | Wright et al. | 455/66 |
| 6,108,523 A | * | 8/2000 | Wright et al. | 455/66.1 |
| 6,144,645 A | * | 11/2000 | Struhsaker et al. | 370/280 |
| 6,185,430 B1 | * | 2/2001 | Yee et al. | 455/519 |
| 6,198,914 B1 | * | 3/2001 | Saegusa | 455/404 |
| 6,201,797 B1 | * | 3/2001 | Leuca et al. | 370/316 |
| 6,222,484 B1 | * | 4/2001 | Seiple et al. | 342/357.09 |
| 6,269,243 B1 | * | 7/2001 | Corbefin et al. | 455/431 |
| 6,421,528 B1 | * | 7/2002 | Rosen et al. | 455/67.6 |
| 6,577,419 B1 | * | 6/2003 | Hall et al. | 398/115 |
| 6,600,914 B2 | * | 7/2003 | Uhlik et al. | 455/404 |

* cited by examiner

Primary Examiner—Edward F. Urban
Assistant Examiner—C. Chow
(74) Attorney, Agent, or Firm—Nathan O. Jensen; Kyle Eppele

(57) ABSTRACT

A multi-channel mobile satellite communication system for normal operation within spotbeams and during emergency operation, beyond the normal limit of a spotbeam. The system involves terminating non-emergency calls, then increasing the transmission power on the one channel to carry the emergency call, to a level above the normally acceptable transmission power levels, thereby permitting an extended range for emergency calls.

13 Claims, 2 Drawing Sheets

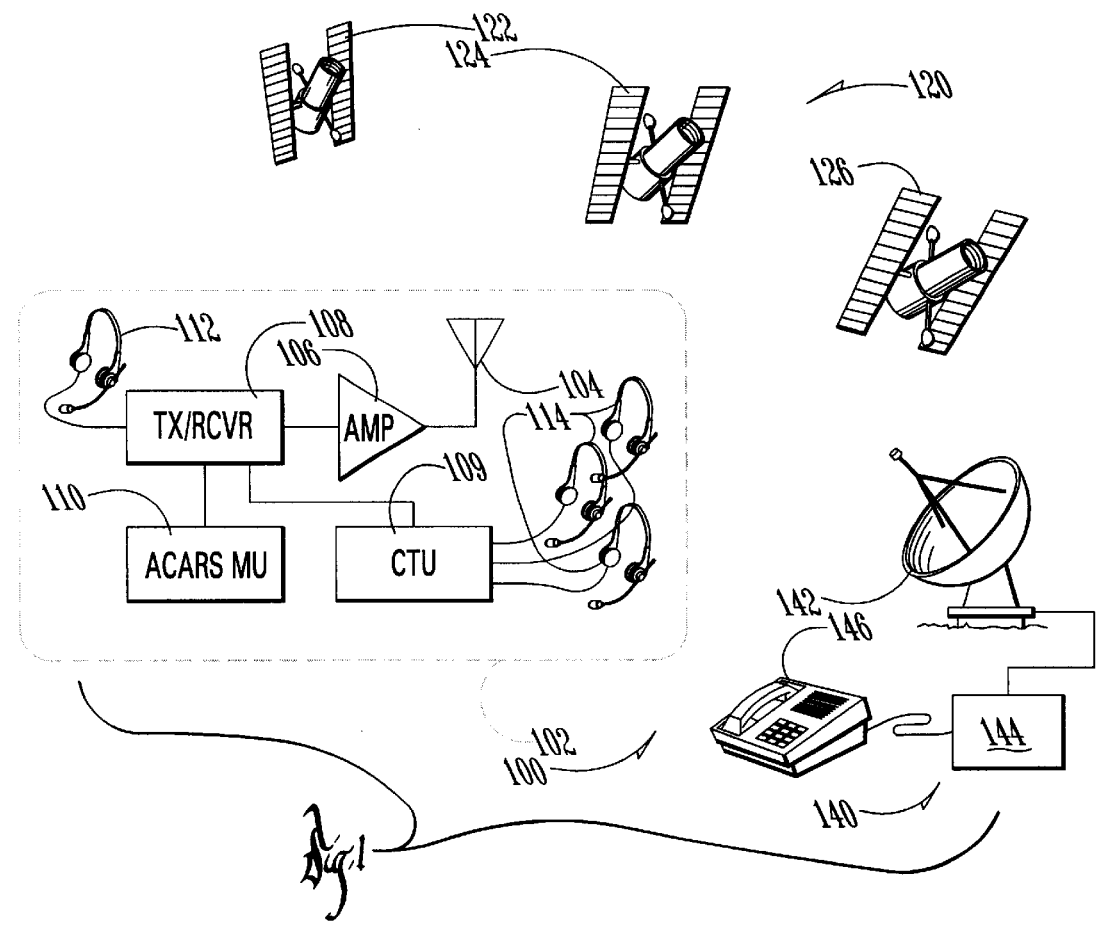

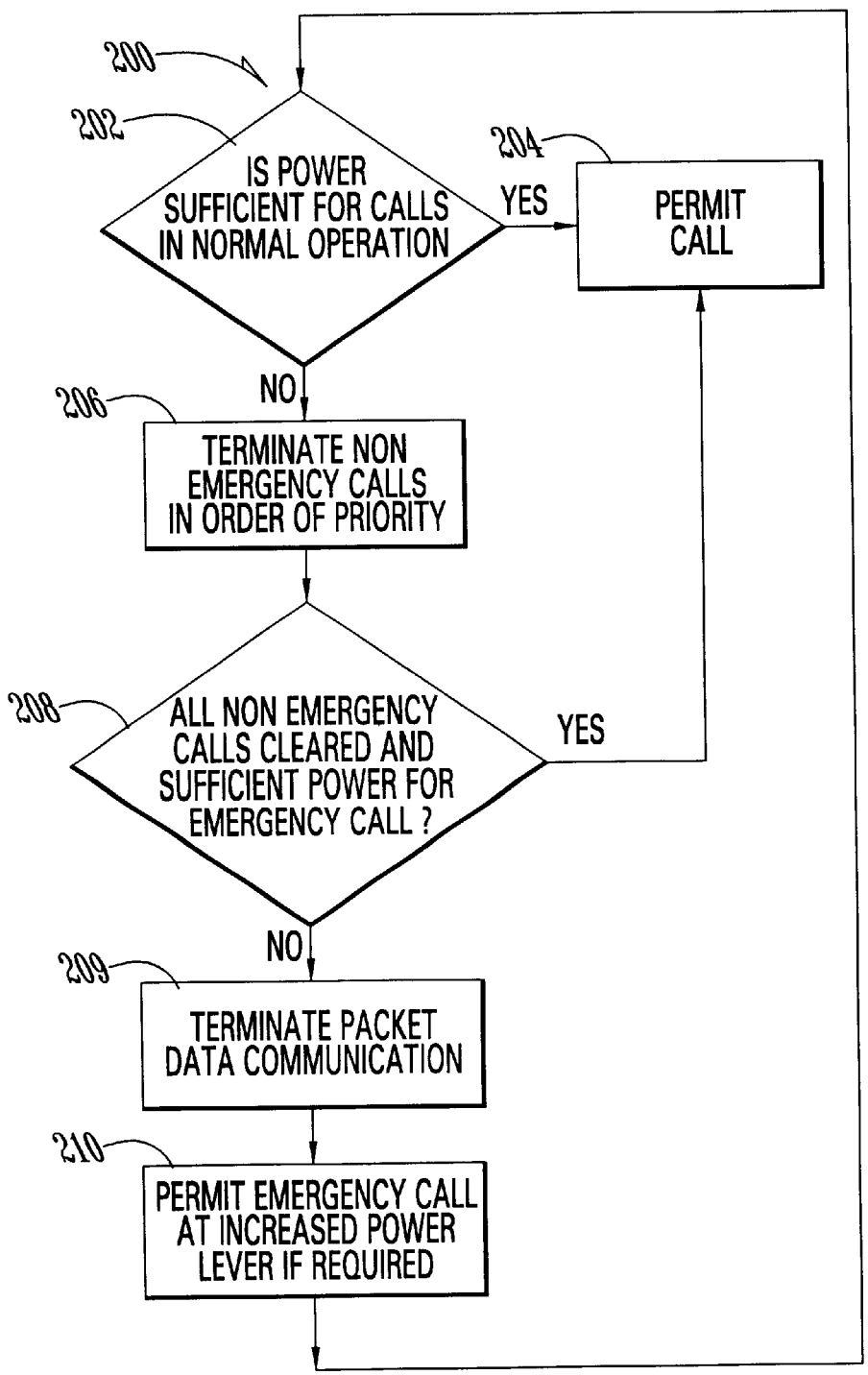

US 6,771,977 B1

DUAL MODE SATELLITE TERMINAL FOR EMERGENCY OPERATION

CROSS REFERENCED RELATED APPLICATIONS

This application relates to copending patent application filed on even date herewith entitled "AIRBORNE SATELLITE COMMUNICATION SYSTEM HAVING A SATELLITE SELECTION ALGORITHM THEREIN WHICH IS DEPENDENT UPON AN ANTENNA MOUNTING CHARACTERISTIC AND AN ANGULAR DISTANCE BETWEEN AN ANTENNA NORMAL LINE AND A LINE TO A SATELLITE" by the same inventor and assigned to the same assignee.

FIELD OF THE INVENTION

The present invention generally relates to airborne satellite voice and data communication systems. In recent years, airlines have increased the availability of satellite voice and data communication systems on board commercial aircraft. For many airlines, satellite communication systems are preferred because of the nearly worldwide coverage area that is frequently available. For example, communication satellites from INMARSAT cover almost the entire globe. Both flight deck and cabin voice and data communications are now available on this worldwide system known in the industry as AERO H, for the high gain transmitter/antenna system used to communicate in the global satellite beams. INMARSAT has offered three types of services for its airline customers: AERO H, which provides a worldwide coverage area with a mosaic of "global beams", and a more geographically limited service known as AERO I, which uses intermediate gain transmitter/antenna systems. The intermediate gain transmitters communicate only while in "spot beams" or nearby areas where the satellites are able to receive signals from the lower power transmitters/antenna systems. The AERO H transmitter antenna system would typically transmit in excess of 40 watts, while the typical AERO I transmitter/antenna system transmits in a range of approximately 20 to 25 watts. The final INMARSAT aeronautical service, AERO L, is a data only service that makes use of the global beam, much in the same manner of AERO H.

The development of spot beam technology allows for use of a smaller, less expensive transmitter and smaller and less expensive antenna systems. Typically, these transmitters have multiple channels allowing several (typically 5) simultaneous conversations from the aircraft to terrestrial positions while the aircraft is within a satellite's spot beam. To prevent one transmitter from interfering with another, satellite service providers require emitted signals from terminals to meet minimum spectral purity requirements that tend to artificially limit the amount of power a transmitter may emit. While the AERO I transmitter/antenna systems have some very significant advantages, such as reduced cost, size and weight, it also has drawbacks as well.

One major drawback of the AERO I system, in comparison with the AERO H system, is its inability to provide truly worldwide communication ability. With their lower power transmitters, AERO I systems typically are only able to provide normal communication services while within or relatively close to spot beams. While this may be economically efficient for many airlines, it is often undesirable for flight crews, especially during times of emergencies in remote areas of the world.

Consequently, there exists a need for improvement in satellite communication systems which provides low cost, low weight and smaller sized transmitter/antenna systems while concomitantly providing expanded emergency communication service areas.

SUMMARY OF THE INVENTION

It is an object of the present invention to increase service coverage for lower power transmitter/antenna systems.

It is a feature of the present invention to include a transmitter having a relatively high power transmitter while in emergency communications mode.

It is an advantage of the present invention to provide nearly worldwide emergency service from a system normally operating only within limited spot beam areas.

It is another object of the present invention to use a lower power transmitter in conjunction with a lower gain antenna system.

It is another feature of the present invention to include a dual mode transmitter where one of the modes is a single channel mode for use during emergencies only.

It is an advantage of the present invention to avoid the distortion products that would otherwise be associated with simultaneous multi-channel operations on multiple frequencies at increased power levels.

The present invention is a method and apparatus for providing nearly worldwide emergency service on a multi-channel satellite voice and data communication system which is typically limited to operation only in spot beams, which is designed to satisfy the aforementioned needs, to achieve the above-included objects, include the previously stated features, and arrive at the already articulated advantages.

The present invention is carried out in a "distortion product-less" system in a sense that the interference that would otherwise result from the distortion products of multiple channels operating simultaneously through a lower power transmitter are eliminated while operating at higher power levels.

Accordingly, the present invention is an apparatus and method which includes a multi-mode transmitter where one mode is an emergency mode in which all but one of the multiple channels are disabled, and the single remaining channel is allowed to broadcast at a higher power level than when the apparatus is operated in another mode, the multi-channel mode.

BRIEF DESCRIPTION OF THE DRAWINGS

The invention may be more fully understood by reading the foregoing description of the preferred embodiments of the invention in conjunction with the appended drawings wherein:

FIG. 1 is a schematic diagram of a prior art satellite communication system.

FIG. 2 is a simplified flow diagram of a process of the present invention.

DETAILED DESCRIPTION

Now referring to the drawings, wherein like numerals refer to like matter throughout, and more particularly to FIG. 1, there is shown a schematic representation of a satellite communication system, generally designated 100 of the prior art, including an airborne earth station segment 102, a satellite segment 120, and a ground earth station segment 140.

Airborne earth station segment 102 is shown having an antenna 104, which is typically disposed on the exterior surface of the aircraft and is typically designed for communicating with the satellite segment 120, using RF communication in the L band; however, other frequencies could be readily substituted. Antenna 104 is coupled through amplifier 106 to transmitter/receiver 108. An ACARS Management Unit (ACARS MU) 110 is shown coupled with transmitter/receiver 108 having a crew headset 112 coupled thereto. A cabin terminal unit (CTU) 109 is shown coupling the passenger headsets 114 with the transmitter/receiver 108. Airborne earth station segments 102 are well known in the art, and numerous modifications and variations of that which is depicted herein are also readily known.

The satellite segment 120 of the satellite communication system 100 is shown having three satellites 122, 124 and 126. Satellite systems may have varying numbers of satellites, and three are shown here only for purposes of simplicity. First satellite 122 is generally depicted in a position above the airborne earth station segment 102. As situated, it is intended to depict a satellite having the highest elevation angle above the horizon. Satellite 124 has an elevation angle between satellite 122 and satellite 126. Satellite 126 is intended to depict a satellite whose elevation above the horizon is a smaller angle than either satellite 122 or 124.

Ground earth station segment 140 is shown as a ground based satellite antenna 142 positioned at a terrestrial location and typically communicating with satellite segment 120 over the C band; however, other frequencies could be readily substituted. Signals received by ground based satellite antenna 142 are then provided over some terrestrial based communication network 144, which could be any type of communication system known in the art. An end user station 146 can be any type of end user operating any type of communication equipment, such as a telephone, computer, etc.

In operation, the prior art satellite communication system 100 may operate as follows: passengers or members of the flight crew on board an aircraft desirous of communicating with an end user station 146, initiate a voice or data call from crew and passenger headsets 112 and 114 respectively. These signals are processed by transmitter/receiver 108 and amplifier 106 and emitted through antenna 104 to a satellite in the satellite segment 120. One of the satellites, acting as a relay station, typically receives signals transmitted from the airborne earth station segment 102 on one frequency, and then relays it to a ground based satellite antenna 142 on another frequency. Signals from the crew and passenger headsets 112 and 114 respectively continue over communication network 144 and are ultimately delivered to end user station 146.

Now referring to FIG. 2, there is shown a flow diagram of a process of the present invention, generally designated 200.

Block 202 depicts well-known algorithms and requirements for Effective Isotropic Radiation Power (EIRP) management. Existing satellite communication systems utilize various forms of power management, all of which are well known in the art. In conjunction with the prior art EIRP management algorithm, several innovative steps are described below. Decision node 200 essentially asks the question whether any emergency calls are in process. If no emergency calls are in process or none have been requested, then the prior art algorithms of blocks 202 and 206 may be implemented. However, if an emergency call is requested, then decision nodes 202 and 208 ask the question of whether the normal EIRP is sufficient to support both packet data services and voice services. If the answer to this question is "yes", then the normal prior art EIRP management algorithms of block 202 can be utilized, and both packet data and voice calls are supported at normal. However, if there is insufficient EIRP to support both packet data and voice, then in accordance with block 206, voice services are terminated as required. Then in accordance with decision node 208, the question is asked whether the EIRP is sufficient to support voice services. If the answer is "yes", then the emergency voice call is supported at normal HPA Drive levels. Note that prior art power management algorithms as depicted by block 202 will typically terminate all voice calls when necessary to support an emergency call. If the decision from decision node 208 is "no", and the normal EIRP is insufficient to support the emergency voice call, then the packet data services are terminated in accordance with block 209. An emergency call is then supported, at a higher power level if required (210).

Since the emergency voice call is the only call in process at the time an increase in drive to HPA may be commanded, the distortion products normally occurring as a result of simultaneous transmissions of several calls is no longer a constraint upon the system. It is believed that the typical power amplifier can be driven to a higher power level during this single channel operation and still provide transmissions which exhibit compliant emission characteristics. With the increased drive to the HPA, the effective isotropic radiation power of the system is increased, thereby enhancing the ability to provide for a longer range communication in more remote areas.

The prior art EIRP management algorithm as depicted in block 202 above may continuously monitor the power level, and if the power level at the output of the HPA should fall back into a linear region in which data communications could be supported, then such services would be permitted.

It is thought that the method and apparatus of the present invention will be understood from the foregoing description and that it will be apparent that various changes may be made in the form, construct steps and arrangement of the parts and steps thereof without departing from the spirit and scope of the invention or sacrificing all of their material advantages. The form herein described is merely a preferred exemplary embodiment thereof.

I claim:

1. A satellite communications system that supports both voice communication and data communication comprising a ground earth station segment, a satellite segment, and an airborne earth station segment, wherein said airborne earth station segment comprises:

a power amplifier for providing signals to an antenna, a management unit for managing power levels of said power amplifier wherein said power levels include a normal level for use during simultaneous voice and data, transmission;

said management unit responsive to requests for voice calls wherein one of said requests is an emergency voice call;

said management unit further for terminating said voice communications when said emergency voice call is present and said power levels are insufficient to support voice and data communications;

said management unit further for terminating said data communications when said emergency voice call is present and said power levels are insufficient to support the emergency voice call and data communications; and said management unit increases drive power to said power amplifier to a level above said normal level for use during an emergency voice call.

2. The satellite communications system of claim 1 wherein said management unit permits data communications when power amplifier power falls into a linear region.

3. A method of satellite communication wherein an airborne earth station segment performs the steps of:

determining whether a call is an emergency voice call;

terminating other calls being transmitted by a common transmitter in the airborne earth station, in response to said emergency call;

increasing a drive of said common transmitter to cause said common transmitter to transmit at a power level in excess of a normal transmission level.

4. A method of claim 3 wherein the step of terminating other calls further includes a step of determining a power level related to an amount necessary to transmit said emergency voice call and said other calls and any packet data service and terminating said other calls if the power level is insufficient.

5. A method of claim 4 further comprising the steps of determining if a power level is sufficient to support the emergency voice call and the packet data service and terminating the packet data service if the power level is insufficient.

6. A method of satellite communication wherein an airborne earth station segment performs the steps of:

making a first determination of whether a power level of an airborne earth station transmitter is sufficient for normal operation, and terminating non emergency calls, in response to said first determination;

making a second determination of whether non emergency calls have been terminated;

making a third determination of whether a current power level of said airborne earth station transmitter is sufficient for an emergency call;

terminating packet data communications in response to said second and third determinations; and, increasing a power level of said airborne earth station transmitter above a normal power level.

7. A method of claim 6 wherein said step of terminating non emergency calls is done as a function of a predetermined priority characteristic.

8. A method of claim 7 wherein said step of terminating packet data communications is a total termination of all packet data communications.

9. A method of claim 6 wherein said second determination is a determination of whether all non emergency calls have been terminated.

10. An apparatus for an airborne earth station segment in satellite communications system comprising:

an airborne earth station transmitter for providing a plurality of simultaneous calls;

means for managing effective isotropic radiation power for said airborne earth station transmitter; and means for determining if an emergency call is to be transmitted by said airborne earth station transmitter and for effecting a change in operation of said means for managing effective isotropic radiation power in response thereto.

11. An apparatus of claim 10 wherein said change in operation is a termination of calls in response to detecting an emergency call.

12. An apparatus of claim 11 where in said change is an increase in transmitter power.

13. An apparatus of claim 10 wherein said means for managing effective isotropic radiation power is a management unit executing a power management algorithm.

* * * * *